Sept. 30, 1930. D. H. HILL 1,777,041
THERMOSTATIC CONTROL MECHANISM
Filed Oct. 19, 1929
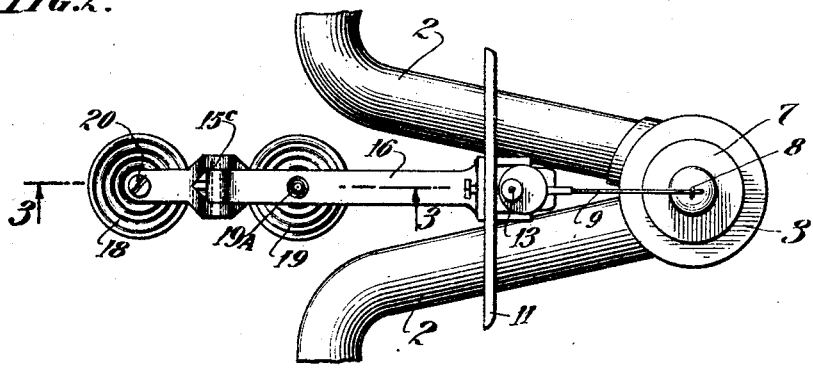
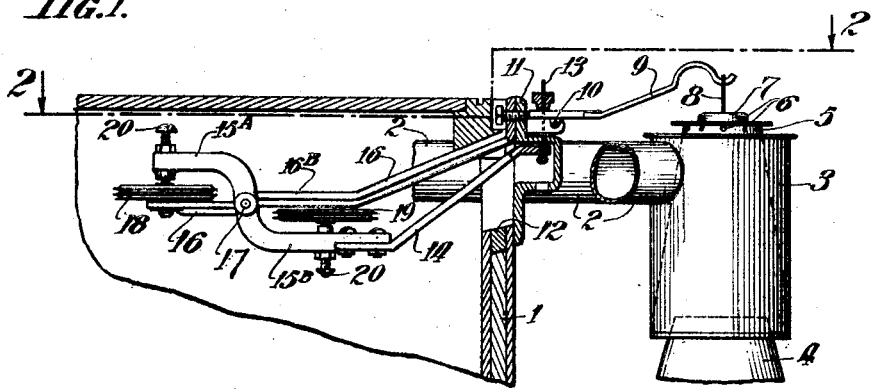
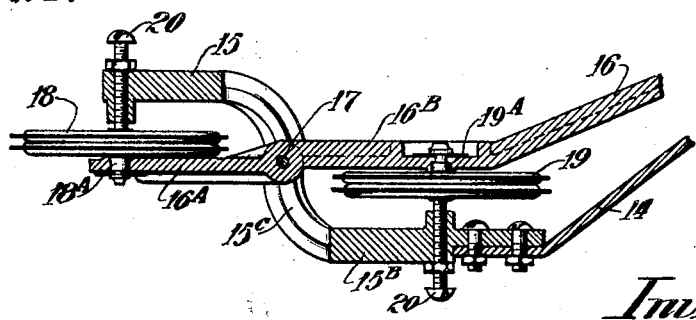
Inventor:
Dewey H. Hill
By: Albert Schieth
Attorney Patented Sept. 30, 1930

1,777,041

UNITED STATES PATENT OFFICE

DEWEY H. HILL, OF MACOMB, ILLINOIS, ASSIGNOR, BY MESNE ASSIGNMENTS, TO GLOBE AMERICAN CORPORATION, OF KOKOMO, INDIANA, A CORPORATION OF INDIANA

THERMOSTATIC CONTROL MECHANISM

Application filed October 19, 1929. Serial No. 400,762.

My invention relates to the class of thermostatic regulators in which the controlling action is secured through the expansion and contraction of thermally responsive devices; and particularly to regulators in which a lever is moved in one direction by a plurality of thermally expansible devices acting on this lever.

In regulating a brooder stove or an incubator thermostatically, it has long been customary to connect the damper associated with such a device to a lever, and to interpose a thermally expansible device between the lever and a stationary thrust member. The expansible devices commonly used for this purpose are flat capsules or hollow wafers each containing a small amount of ether, from which the ether may escape unnoticed in case a wafer is damaged or otherwise has its seal broken, so that such a so-called thermostatic wafer is not entirely dependable for the desired control of the device which is to be regulated by it.

Since an improper regulation of a brooder stove may cause the death of scores of chicks, and since an improper regulation of an incubator may spoil hundreds of eggs, such appliances now are often provided with regulators employing two thermostatic wafers respectively engaging the two arms of a lever of the first class, which lever is pivoted on one arm of the actuating lever of the appliance. Thus arranged, the unruptured wafer will still move the actuating lever in case the other wafer becomes inoperative, so that there still is some thermostatic regulation.

However, the movement imparted to the actuating lever by the expansion of the remaining operative wafer is halved by the interposed connecting lever, so that the damper or other control element of the appliance will only be moved half of the intended distance, thereby still causing damage to the objects heated by the appliance.

One of the main objects of my present invention is to overcome the just recited difficulty by providing a thermostatic regulator which will also employ two wafers or other thermally expansible members, so as to leave one of the wafers effective in case the other gives out, but will do so without reducing the movement of the actuating lever in response to the increase in temperature for which the wafers are constructed. Moreover, my invention aims to provide a simple and effective arrangement permitting such a more effective employment of two wafers in a thermostatic regulating mechanism, which will permit an independent adjustment for the two wafers, and which will be particularly suitable for use in connection with incubators heated by oil-burning lamps.

Still further and also more detailed objects will appear from the accompanying drawings and form the following specification, in which Fig. 1 is a vertical section through a portion of an incubator equipped with a thermostatic regulator embodying my invention.

Fig. 2 is a section taken along the line 2—2 of Fig. 1.

Fig. 3 is an enlarged and fragmentary vertical section, taken along the line 3—3 of Fig. 2.

In the drawings, Fig. 1 shows a portion of an incubator having an end wall 1 through which hot water piping 2 extends from a tubular water container 3, this container being heated by an oil lamp disposed so that the upper end of its lamp chimney 4 extends into the lower portion of the water container. The bore of this tubular container has an upward extension 5 forming a flue provided with perforations 6 through which the combustion gases can issue at all times, and the exit of such gases through the upper end of the flue is controlled by a damper 7 which may seat on the upper end of the flue when the incubator is so cool that the maximum heating effect of the lamp on the water container is needed.

This damper 7 is suspended by a link 8 from the outer arm 9 of a damper lever which is pivoted at 10 on a casting 11 which extends across an aperture 12 in the incubator wall 1. The inner arm of the damper lever is connected by an adjustable stem 13 to the extension portion 14 of the outer arm of the actuating lever 15 of my thermostatic regulating mechanism. This lever is formed intermediate its ends with bends, so as to offset the inner arm 15A from the other arm 15B, and the part of the lever between the said inner and outer arms is provided with a perforation 15C.

Extending through this perforation is a stationary bracket 16 which effectively crosses the actuating lever, so that the inner part 16A of this bracket underhangs the inner arm 15A of the actuating lever, while another bracket portion 16B overhangs the outer arm 15B of the same lever, and a horizontal pivot pin 17 extends across the perforation 15C in the actuating lever to pivot this lever to the bracket at their crossing point on a horizontal axis.

Thus arranged, the actuating lever and the supporting bracket for this lever (which bracket forms the stationary thrust member of my mechanism) are pivotally connected after the manner of pliers. Then I interpose two thermally expansible members 18 and 19 between the actuating lever and the supporting bracket, respectively at opposite sides of the pivot pin 17.

For the thermally expansible members I desirably employ thermostatic (ether containing) wafers, each having a stem (18A, 19A) socketed in the supporting bracket, each wafer being of less height than the minimum operative spacing of the bracket and lever portions between which that wafer member is interposed, I also preferably provide an adjusting screw 20 associated with each lever arm and engaging the adjacent thermostatic wafer so that the latter can be suitably adjusted. I also desirably space the two wafer members equally from the pivot pin, so that counterpart wafers will exert an equal leverage on the actuating lever.

When the mechanism is thus assembled, a rise in the incubator temperature to the point where the ether in the wafers begins to vaporize will expand both wafers, and each wafer will rock the actuating lever in the same direction, namely clockwise in Figs. 1 and 3. Hence the resulting movement due to a given expansion of one wafer member will be the same as if the other wafer member were absent, but the effective power will be doubled.

If one wafer member is defective or becomes inoperative (as for example, by the escape of the ether from it), the other wafer member will still move the actuating lever to the full extent for which the mechanism is designed, instead of having the extent of this movement reduced as in the case of previously employed wafer and lever arrangements. Thus, with the illustrated incubator, even a single one of the wafer members 18 or 19 will still lift the damper 8 for the full intended height when that wafer is expanded, instead of only raising the damper for a decreased distance when one of these wafer members has given out.

Since suitable thermostatic wafers are quite cheap, the safeguard thus secured by my invention can be obtained at a trifling cost. Moreover, if a single thermostatic wafer of the commercial types does not afford the desired reserve in actuating power, each wafer member may be composed of a plurality of superposed wafers, such as the twin wafers shown in the drawings.

However, while I have heretofore described my invention as employed in connection with an incubator, I do not wish to be limited to any particular use of my thermostatic control mechanism. Nor do I wish to be limited to the providing of a separately attached lever extension on the actuating lever (of which the extension 14 effectively forms a part), or to other details of the construction and arrangement above disclosed, since many changes might be made without departing either from the spirit of my invention or from the appended claims.

I claim as my invention:

1. A thermostatic regulator comprising a stationary thrust member, a lever extending across the said member, means pivoting the lever to the said member at the crossing thereof, and two thermally expansible means interposed between the thrust member and the lever respectively at opposite sides of the pivoting means.

2. A thermostatic regulator comprising a stationary thrust member, a lever extending across the said member, means pivoting the lever to the thrust member at the crossing thereof, and two counterpart thermally expansible means interposed between the thrust member and the lever respectively at opposite sides of the pivoting means and at equal distances from the latter.

3. A thermostatic regulator comprising a stationary thrust member, a lever extending across the said member, means pivoting the lever to the thrust member at the crossing thereof, two thermally expansible means interposed between the thrust member and the lever respectively at opposite sides of the pivoting means, and independent adjusting means respectively associated with the two thermally expansible means.

4. A thermostatic regulator comprising a stationary thrust member, a lever extending across the said member, means pivoting the lever to the thrust member at the crossing thereof, two adjusting means threaded through the lever at opposite sides of the pivoting means and each extending beyond the lever toward the thrust member, and two thermally expansible means each interposed between the thrust member and one of the adjusting means.

5. The combination with a damper, of a stationary supporting member, a lever of the first class crossing and pivoted to the said member, two thermally expansible means interposed between the lever and the said member respectively at opposite sides of the axis of the said pivoting, and connections between one arm of the lever and the damper for moving the damper.

6. The combination with a damper, of a stationary supporting member, a lever of the first class crossing and pivoted to the said member, two thermally expansible means interposed between the lever and the said member respectively at opposite sides of the axis of the said pivoting, a second lever having one arm arranged for supporting the damper, and an adjustable connection between the other arm of the second lever and one arm of the first named lever.

7. A thermostatic regulator comprising a generally horizontal stationary supporting member having a vertical perforation intermediate its ends, a lever extending through the said perforation and presenting arms respectively overhanging and underhanging the said member, means extending across the perforation for pivoting the lever to the said member on a horizontal axis, and two thermally expansible members respectively interposed between the said member and the said lever arms.

8. A thermostatic regulator as per claim 7, including two adjusting means both mounted on the lever and each associated with one of the thermally expansible members.

9. A thermostatic regulator comprising a stationary thrust member, a lever extending across the said member, means pivoting the lever to the said member adjacent to the crossing thereof, two thermally expansible members both supported by the thrust member and at opposite sides of the thrust member and of the axis of the said pivoting, and separate thrust screws threaded through the lever and respectively engaging the two thermally expansible members.

10. A thermostatic regulator comprising a stationary thrust member, a lever extending across the said member, means pivoting the lever to the said member adjacent to the crossing thereof, two thermally expansible members both supported by the thrust member and at opposite sides of the thrust member and of the axis of the said pivoting, each of the said expansible members being operatively interposed between the thrust member and one arm of the lever, the lever and the thrust member extending one through the other.

Signed at Macomb, Illinois, October 16th, 1929.

DEWEY H. HILL.